United States Patent [19]

Ault

[11] Patent Number: 5,271,283

[45] Date of Patent: Dec. 21, 1993

[54] BALLISTIC IMPULSE GAUGE

[75] Inventor: Stanley K. Ault, Antioch, Calif.

[73] Assignee: The United States of America as represented by The United States Department of Energy, Washington, D.C.

[21] Appl. No.: 860,964

[22] Filed: Mar. 31, 1992

[51] Int. Cl.[5] ............................................. G01L 5/00
[52] U.S. Cl. ................................. 73/862.584; 73/744
[58] Field of Search .......................... 73/35 K–35 P, 73/862–862.382, 862.584; 287/181, 161; 367/187, 183; 7/744

[56] References Cited

U.S. PATENT DOCUMENTS

| | | | |
|---|---|---|---|
| 1,702,456 | 2/1929 | Trumpler | 367/178 |
| 3,336,807 | 8/1967 | VanLint et al. | 73/398 |
| 3,638,160 | 1/1972 | Huddleston | 338/36 |
| 4,141,236 | 2/1979 | Ellington | 73/11 |
| 4,379,401 | 4/1983 | San Miguel | 73/12 |
| 4,412,317 | 10/1983 | Asjes et al. | 367/187 |
| 4,458,344 | 7/1984 | Coogler | 267/161 |
| 4,495,809 | 1/1985 | Higginbothom et al. | 73/432 |
| 4,730,502 | 3/1988 | Kemmler | 73/866.1 |
| 4,932,239 | 6/1990 | Regalbuto | 73/35 |

Primary Examiner—Richard E. Chilcot, Jr.
Assistant Examiner—R. Biegel
Attorney, Agent, or Firm—Henry P. Sartorio; Roger S. Gaither; William R. Moser

[57] ABSTRACT

A gauge for detecting the impulse generated in sample materials by X-rays or other impulse producing mechanisms utilizes a pair of flat annular springs to support a plunger relative to a housing which may itself be supported by a pair of flat annular springs in a second housing. The plunger has a mounting plate mounted on one end and at the other, a position or velocity transducer is mounted. The annular springs consist of an outer ring and an inner ring with at least three arcuate members connecting the outer ring with the inner ring.

17 Claims, 3 Drawing Sheets

BALLISTIC IMPULSE GAUGE

The United States Government has rights in this invention pursuant to Contract No. W-7405-ENG-48 between the U.S. Department of Energy and the University of California for the operation of Lawrence Livermore National Laboratory.

TECHNICAL FIELD

This invention relates to an impulse gauge and in particular it relates to an impulse gauge capable in detecting the impact of such things as X-rays and the like on a surface.

BACKGROUND OF THE INVENTION

There is a need to measure low levels of impulse generated in sample materials by such things as X-rays. This need occurs with particularity in underground nuclear tests but also to some extent in above ground high powered testing facilities.

The traditional method for measuring impulses is to use a linear velocity transducer. Such devices generally depend on the linear displacement of the device and thus are limited by the friction in the linear bearing movement.

Devices to measure small movements have outstripped the capability to detect such movements. Specifically, while transducers employing eddy current position sensors, coil and magnet velocity transducers or optical position encoders which utilize gratings in order to use a Moire effect to detect the position of a plunger are readily available, the mounting of the device is still a problem.

The problem is constructing a device that will move or oscillate as a result of extremely small forces that are present due to the impact of electromagnetic radiation such as X-rays, gamma rays or the like on samples. Once the device is constructed it must be isolated from the environment to eliminate unwanted signals.

Accordingly, this device includes a structure that is sensitive to the impact of extremely small forces in a mechanical sense so that the displacement of the device may be measured by one of the apparatuses described above.

It is an object of this invention to provide an impulse ballistic gauge that is sensitive to extremely small forces.

It is a further object of this invention to provide such a gauge that enables one to transmit the impulse of such small forces to an impulse sensing device.

It is still another object of this invention to provide a resilient mounting system for an impulse gauge that permits oscillation in response to the imposition of a momentary force on the gauge.

SUMMARY OF THE INVENTION

A ballistic impulse gauge is disclosed which consists of a pair of resilient members and an impulse receiving piston. The resilient members are fixed to an outer casing and to the impulse receiving piston so that the impulse receiving piston may oscillate relative to the outer casing.

DETAILED DESCRIPTION OF THE PREFERRED EMBODIMENT

Figure 1:
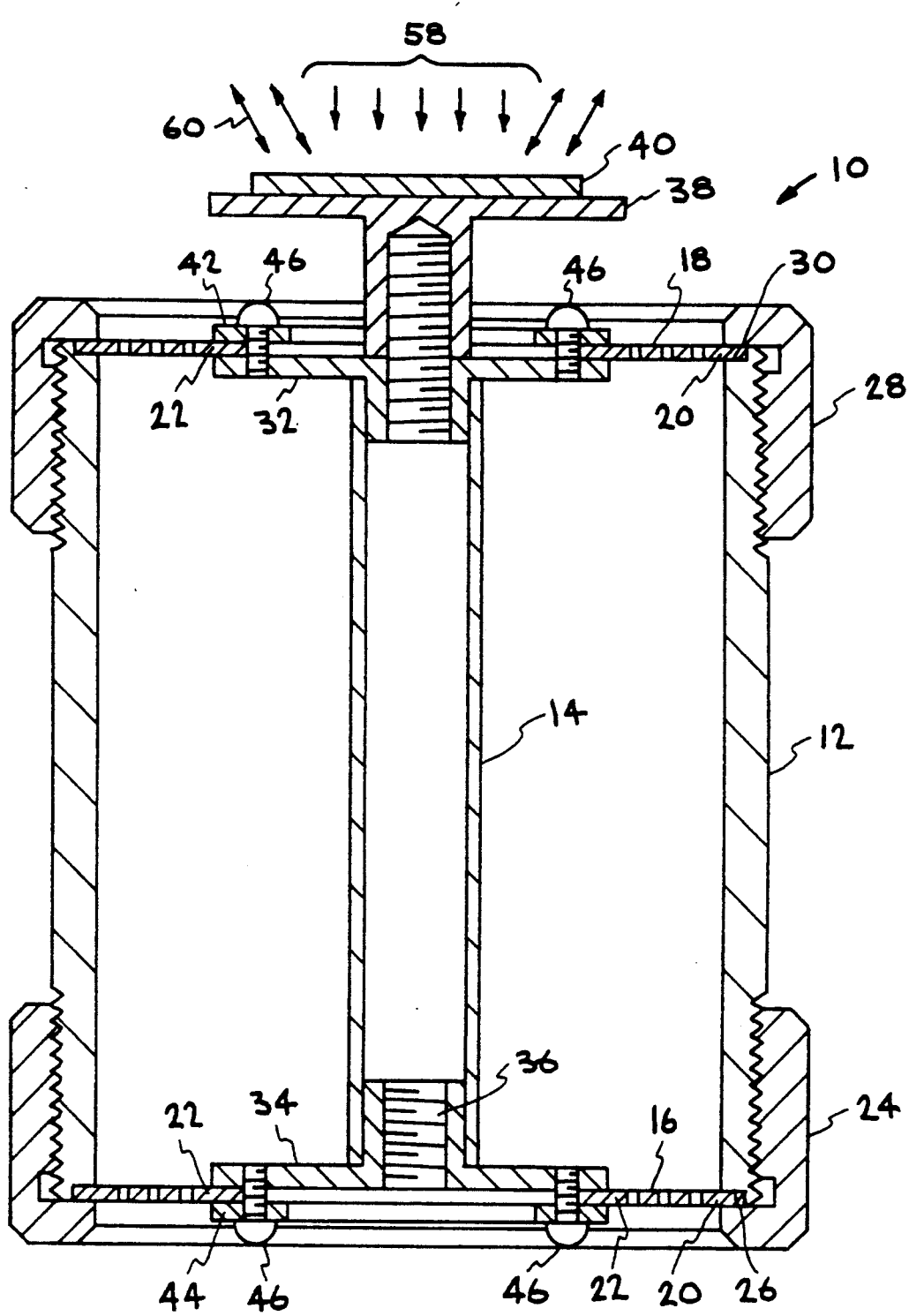
FIG. 1 is a sectional view of the ballistic impulse device described herein.
Figure 2:
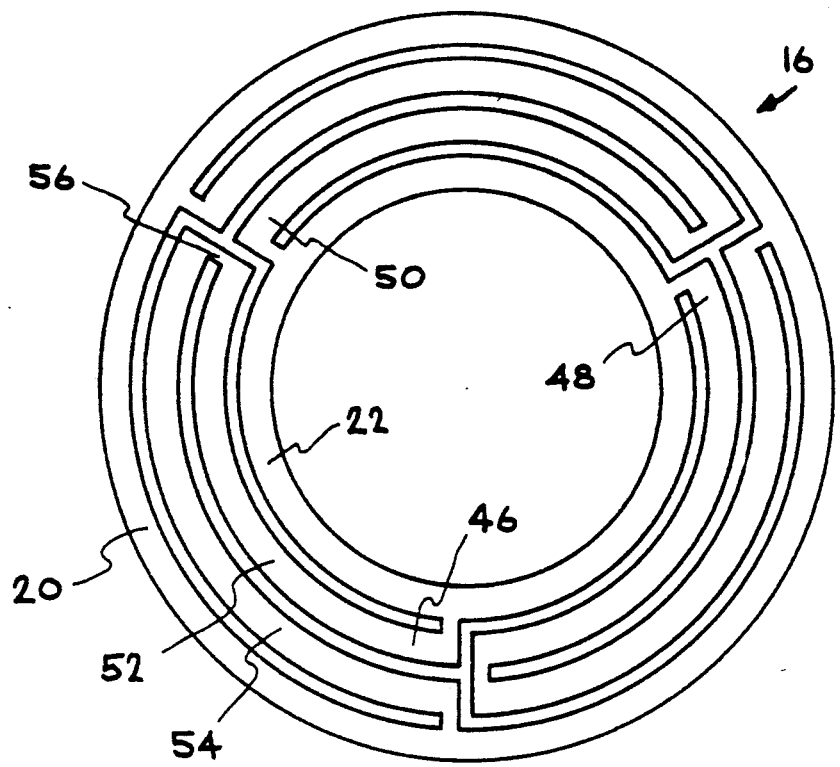
FIG. 2 is a plan view of one of the annular springs utilized in the device disclosed in FIG. 1.
Figure 3:
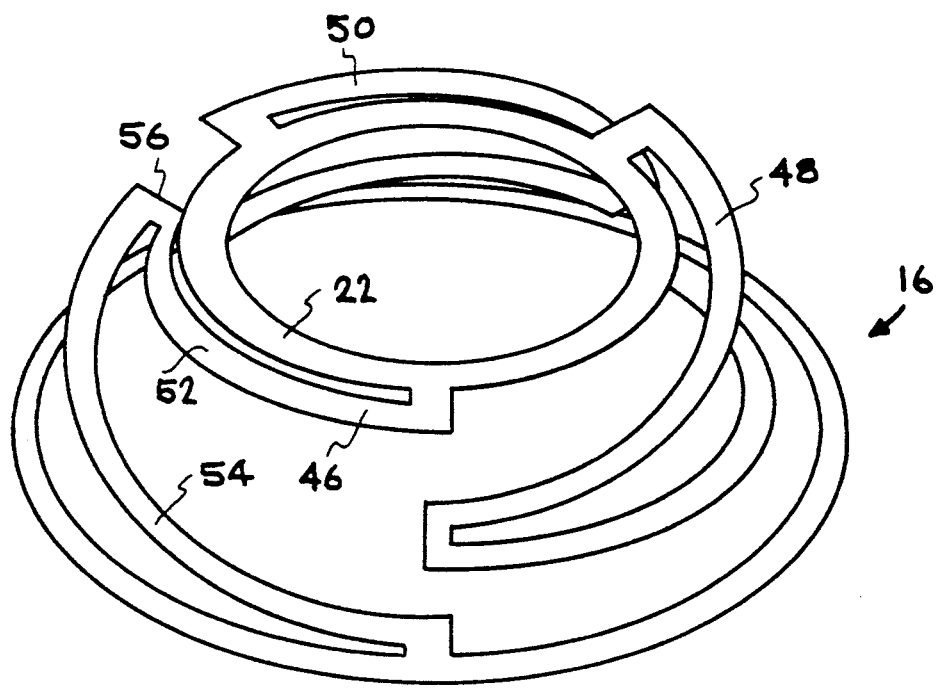
FIG. 3 is spring shown in FIG. 2 in a stretched state and in perspective.

Referring now to FIG. 1, a ballistic impulse gauge 10 is shown. The gauge 10 consists of a cylindrical housing 12 supporting a plunger or piston 14. Piston 14 is mounted in housing 12 by means of a pair of flat annular springs 16 and 18. Referring to FIG. 2, one of these flat annular springs 16 is illustrated. It should be understood that spring 18 is identical in form to the spring 16 In like manner, FIG. 3 shows the spring 16 in its extended mode. More will be said about the detail of the spring in the subsequent discussion. Suffice it to say at this point that the spring consists of an outer annular ring 20 and an inner annular ring 22.

Flat annular spring 16 is held adjacent to housing 12 by a cap piece 24 that engages outer annular ring 20 between housing 12 and the cap piece. Cap piece 24 is threadably engaged on housing 12 in the manner shown in FIG. 1. Specifically, an annular groove may be machined into the inner periphery of housing 12 to form groove 26 that is sized to receive the outer annular ring. At the opposite end of housing 12 is a matching cap piece 28 and groove 30 to engage flat annular spring 18 adjacent housing 12 in the manner illustrated.

Piston 14 has affixed at each end flanges 32 and 34. A central threaded bar 36 may be used to accomplish the fixture of flanges 32 and 34 to piston 14. Also associated with piston 14 is a mounting plate 38 upon which a sample such as impact member or plate 40 may be positioned. Piston 14 is associated with housing 12 by means of annular disks 42 and 44 which are bolted to flanges 32 and 34 respectively, by means of bolts 46. Between mounting disks 42 and flange 32 is the inner annular ring 22 of flat annular spring 18. In like manner, the inner annular ring 22 of flat annular spring 16 is positioned between flange 34 and annular disk 44.

Referring now to FIG. 2, it can be seen that the inner annular ring 22 is interconnected with the outer annular ring 20 by means of three elongated arcuate members 46, 48 and 50 best illustrated in FIG. 3 in the extended position. Each of the elongated arcuate members is affixed at its inner end to the inner ring 22 and its outer end to the outer ring 20. Referring specifically to arcuate member 46, there is an inner portion 52 and an outer portion 54 which are connected by a cross member 56 so that, in referring to FIG. 2, the inner member 52 is affixed at one end thereof to inner annular ring 22 and at its other end to the cross member 56 while the outer portion 54 is affixed at one end to the cross member 56 and at its other end to the outer ring 20. The result of this is best shown in FIG. 3 wherein the spring member consists of three leaf-type springs that fold back upon themselves at the cross members.

Based on the fact that the type of impulse being measured with this device is very short compared to the oscillation time of the plunger the device will work adequately to measure very small impulses. It is to be understood that the spring constants of the device are selected through test conditions. It has been found that the energy loss per cycle of oscillation is quite small so good measurements of the impulse can be obtained even if background noise obscures the data during the first oscillation of the plunger. Measurement is made by detecting the motion of the plunger as it oscillates around its rest position, since both the maximum velocity of the plunger and the maximum displacement are linearly proportional to the magnitude of the applied impulse, then by measuring either quantity a good measure of the impulse can be obtained.

The impulse on the sample pushes the pendulum or piston 14 downwardly. The annular springs 16 and 18 provide a restoring force, so the pendulum or piston 14 will oscillate. If the impulse is applied over a time which is short compared to the oscillation period, then one can assume that the piston 14 is instantaneously given a velocity v. The piston motion will be stopped and its direction reversed when $$\frac{1}{2} K x_m^2 = \frac{1}{2} m v_0^2 \quad \text{1)}$$

Where $K$ = spring constant $\left(\frac{dyne}{cm}\right)$ $x_m$ = maximum displacement (cm)
m = pendulum mass (g) (cm/sec.)

Let $\Gamma$ = impulse/area (taps) = $\left(\frac{dyne\ sec}{cm^2}\right)$

A = sample area (cm²)
r = sample radius (cm)
I = impulse (dyne sec.)

$$I = \Gamma A = \pi r^2 \Gamma \quad (2)$$

By Newton's law, $mv_0 = I$ so $$\frac{1}{2} m v_0^2 = \frac{1}{2m} m^2 v_0^2 = \frac{I^2}{2m} = \frac{\pi^2 r^4 \Gamma^2}{2m} \quad \text{3)}$$

so we have:

$$K x_m^2 = \frac{\pi^2 r^4 \Gamma^2}{m} \quad \text{4)}$$

It is pointed out that the maximum displacement varies linearly with impulses so by measuring $x_m$ one gets a good measurement on $\Gamma$. With a limit of 3 mm on $x_m$ due to the type of position sensor used, this forms one condition which must be satisfied. One can adjust K, r and m if needed. The value of r cannot be made too small or edge effects may make impulse calculations difficult.

Another condition comes from the fact that the measurements must be made before arrival of ground shock at 100 ms. This means that the period of the oscillation must be no longer than 200 ms if one is to get ½ cycle of operation before shock arrival. For simple harmonic motion:

$$\omega = \sqrt{\frac{K}{m}} = 2\pi f = \frac{2\pi}{T} \quad \text{5)}$$

where f = frequency (H₂) and T = period (sec.)

$$K = m\omega^2 = \frac{4\pi^2 m}{T^2} \quad \text{6)}$$

Putting 6) into 4) one has $$\frac{4\pi^2 m}{T^2} x_m^2 = \frac{\pi^2 r^4 \Gamma^2}{m} \quad \text{7)}$$

$$m^2 = \frac{r^4 \Gamma^2 T^2}{4 x_m^2} \quad \text{8)}$$

$$m = \frac{r^2 \Gamma T}{2 x_m} \quad \text{9)}$$

$$K = \frac{2\pi^2 r^2 \Gamma}{x_m T} = \frac{4\pi^2 m}{T^2} \quad \text{10)}$$

The equation of motion of the mass will be:

$$x = x_m \cos\left(\sqrt{\frac{K}{m}}\ t + \phi\right) \quad \text{11)}$$

$$v = \frac{dx}{dt} = -\sqrt{\frac{K}{m}}\ x_m \sin\left(\sqrt{\frac{K}{m}}\ t + \phi\right) \quad \text{12)}$$

The maximum velocity is $$v_m = \sqrt{\frac{K}{m}}\ x_m$$

using equation 9) $\rightarrow v_m = \sqrt{\frac{K}{m}}\ \frac{r^2 \Gamma T}{2m}$ but $T = \frac{2\pi}{\sqrt{\frac{K}{m}}}$ so $$v_m = \frac{\pi r^2 \Gamma}{m}$$

This is consistent with the assumption that the impulse is applied over a time which is short compared to the oscillation time. In other words, the motion of the mass just after impulse is the same as for a free body because the spring has not yet been stretched.

In the device used the measured value for K for both springs together is 890000 dyne/cm. These are the springs used to shock isolate the standard impulse gauges.

Figure 4:
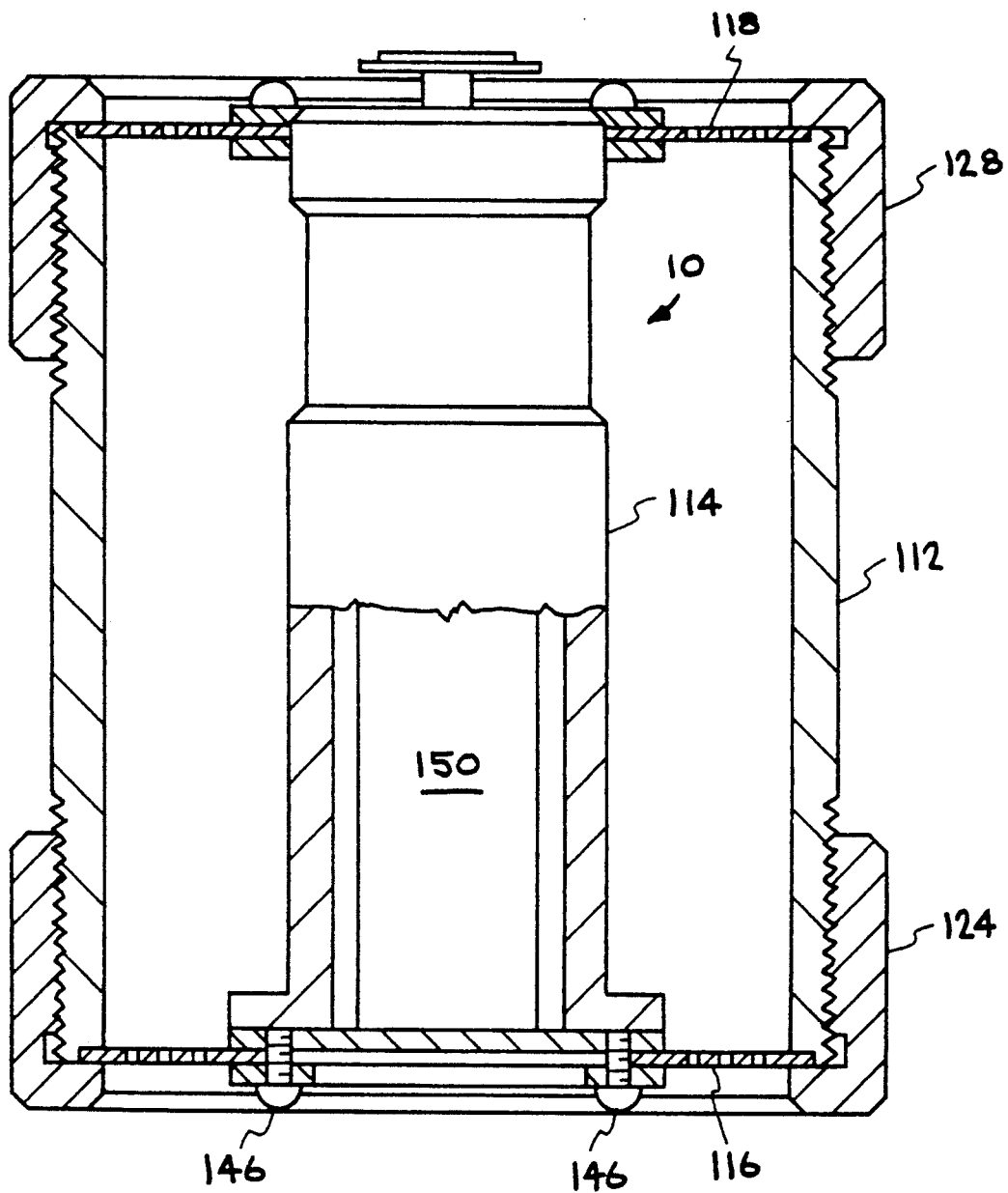
FIG. 4 is a view of the device shown in FIG. 1 mounted in a shock-absorbing system.

In operation it has been found that device 12 should be isolated from a surrounding environment as the surrounding environment may very well be in relatively strong movement particularly in the nuclear test environment. Accordingly, the device 10 can be mounted in a separate housing 112 as shown in FIG. 4 which consists of the similar but larger cap pieces 124 and 128 to retain a pair of flat annular springs 116 and 118 in the same manner as the device 10. A modification to the cap piece 24 in the device 10 in this mounting scheme is shown as an elongated cylinder 114 threaded at one end to engage the housing 12 of device 10 and at the same time retain the flat annular spring 16 in position relative to the piston 14. Thus device 10 is mounted (with extended cap or cylinder 114) within housing 112 in a manner similar to the mounting of plunger or piston 14 in the device 10. That is, a cap member 124 and cap member 128 can engage a lower spring 116 and an upper spring 118 in the manner described above with relation to the impulse gauge.

Cap piece 24 of device 10 is further modified in this embodiment so that it forms extended cylinder 114 that is fixable to the lower spring 116 by means of bolts 146 and appropriate flange members. Positioned below and operatively connected to the gauge 10 within cylinder 114 is a measuring device or transducer 150 of the type described above. That is, the transducer 150 could be an eddy current device, a coil and magnet velocity transducer or an optical position and coder which utilizes gratings and is based on the Moire effect to detect position of the plunger. Appropriate wiring of course to external gauges is assumed.

In this embodiment, the gauge 10 is isolated from vibrations so that unwanted signals not resulting from the impulse to be measured can in fact be eliminated. The isolation springs 116 and 118 are chosen to give an oscillation frequency for the entire gauge assembly which is very low compared to the oscillation frequency of the plunger 14. The result would be a very poor coupling between the environment and the plunger so that gauge would not be sensitive to external vibrations.

OPERATION OF THE PREFERRED EMBODIMENT

It should be apparent to one skilled in the art how the operation of the described device operates. Nevertheless, the following description is offered. The device is mounted essentially as shown in FIG. 4 with the sample upon which the impulse is to be detected located on mounting plate 38. When located at the point where measurement of an impulse is desired, the impulse sensing device or transducer 150 is activated and the impulse, shown as arrows 58 in FIG. 1 causes oscillation of the sample or plate 40 in the manner shown by the arrow 60 so that the piston or plunger 14 moves upwardly and downwardly as shown in FIG. 1. Such movement is read by the transducer 150 where it can be translated into the force that has been received by the impulse on the plate 40.

It is to be understood that this invention is not to b limited by the aforesaid description but rather to be limited only by the appended claims.

I claim:

1. A ballistic impulse gauge comprising:
a pair of resilient members,
an impulse receiving piston located intermediate said pair of resilient members,
an outer casing, and
an impact member affixed to one end of the impulse receiving piston and located externally of said outer casing,
said resilient members affixed to said outer casing and to said impulse receiving piston so that said impulse receiving piston may oscillate relative to said outer casing.

2. The gauge of claim 1 wherein each of said resilient members comprise a unitary structure consisting of an outer annular ring, an inner annular ring, and
a plurality of at least three elongated arcuate members interconnecting said outer annular ring with said inner annular ring.

3. The gauge of claim 2 wherein each of the elongated arcuate members comprises an outer portion, an inner portion and a cross member, said outer portion being substantially parallel to said inner portion and unitarily connected to the inner periphery of said outer annular ring at one end and to one end of said cross member at its other end, said inner portion being connected at one end to the other end of said cross member and at its other end to the outer periphery of said inner annular ring.

4. The gauge of claim 3 wherein the impulse receiving piston is affixed to each of the inner annular rings.

5. The gauge of claim 3 wherein each of the outer annular rings is affixed to the inner periphery of the outer casing.

6. The gauge of claim 3 wherein the outer casing is cylindrical and defines a first end and a second end; and further wherein the first of the two resilient members is affixed at its outer periphery to the first end of the outer casing and the second of the two resilient members is affixed at its outer periphery to the second end of the outer casing.

7. The gauge of claim 6 wherein the impulse receiving piston comprises of an elongated member having a length substantially equal to the length of the outer casing and further wherein said impulse receiving piston defines a first end and a second end.

8. The gauge of claim 7 wherein said impulse receiving piston is affixed at its first end to the inner periphery of the first of the two resilient members and wherein said impulse receiving piston is affixed at its second end to the inner periphery of the second of the two resilient members.

9. A ballistic impulse gauge assembly comprising:
a first pair of resilient members,
an impulse receiving piston,
a first casing;
an impact receiving member affixed to said piston and located external to said first casing;
said first pair of resilient members affixed to said first casing and to said impulse receiving piston so that said impulse receiving piston may oscillate relative to said first casing;
a second pair of resilient members;
a second casing;
said second pair of resilient members affixed to said second casing and to said first casing so that said first casing may oscillate relative to said second casing; and
transducer means mounted between one of said second pair of resilient members and said impulse receiving piston and operatively connected to receive an output from said impulse receiver piston.

10. The gauge of claim 9 wherein the transducer means comprise an eddy current position sensor, a coil and magnet velocity transducer, or an optical position encoder.

11. The assembly of claim 9 wherein each of said resilient members comprise a unitary structure consisting of an outer annular ring, an inner annular ring, and
a plurality of at least three elongated arcuate members interconnecting said outer annular ring with said inner annular ring.

12. The assembly of claim 11 wherein each of the elongated arcuate members comprises of an outer portion, an inner portion and a cross member, said outer portion being substantially parallel to said inner portion and unitarily connected to the inner periphery of said outer annular ring at one end and to one end of said cross member at its other end, said inner portion connected at one end to the other end of said cross member and at its other end to the outer periphery of said inner annular ring.

13. The assembly of claim 9 wherein the first and second casings are each cylindrical and define a first end and a second end; and further wherein the first of each pair of resilient members is affixed at its outer periphery to the first end of the first and second casings, and the second of each pair of resilient members is affixed at its outer periphery to the second end of the first and second casings.

14. The assembly of claim 13 wherein the impulse receiving piston comprises of an elongated member having a length substantially equal to the length of the first casing and further wherein said impulse receiving piston defines a first end and a second end.

15. The assembly of claim 14 wherein said impulse receiving piston is affixed at its first end to the inner periphery of one of the first pair of resilient members, and wherein said impulse receiving piston is affixed at its second end to the inner periphery of another of the first pair of resilient members.

16. The assembly of claim 13 wherein said second end of said first casing includes a cylindrical member which is secured to a resilient member of said second pair of resilient members.

17. The assembly of claim 16 wherein said transducer means is located within said cylindrical member and operatively connected to receive an output from said impulse receiving piston.

* * * * *